United States Patent [19]
Liang et al.

[11] Patent Number: 6,164,059
[45] Date of Patent: Dec. 26, 2000

[54] MULTI-EXPANSION EJECTOR NOZZLE WITH DIVERGING WALLS

[75] Inventors: George P. Liang, Palm City, Fla.; John F. Soileau, Tullahoma, Tenn.

[73] Assignee: United Technologies Corporation, Hartford, Conn.

[21] Appl. No.: 08/559,118

[22] Filed: Nov. 17, 1995

[51] Int. Cl.[7] ............................... F02K 1/36; F02K 1/12
[52] U.S. Cl. ............... 60/230; 60/266; 239/127.3; 239/265.17; 239/265.35
[58] Field of Search ............... 60/230, 232, 266, 60/271, 752; 239/127.3, 265.35, 265.37, 265.17

[56] References Cited

U.S. PATENT DOCUMENTS

| | | | |
|---|---|---|---|
| 3,091,924 | 6/1963 | Wilder, Jr. | 60/271 |
| 3,386,658 | 6/1968 | Mehr | 60/271 |
| 3,394,549 | 7/1968 | Sutor | 60/271 |
| 3,398,896 | 8/1968 | Rabone | 60/232 |
| 4,007,586 | 2/1977 | McDermott | 60/271 |
| 4,355,507 | 10/1982 | Coffey et al. | 239/265.17 |
| 4,372,110 | 2/1983 | Cheng | 239/265.17 |
| 4,690,329 | 9/1987 | Madden | 60/230 |
| 4,773,593 | 9/1988 | Auxier et al. | 239/127.3 |
| 5,351,888 | 10/1994 | Taylor et al. | 60/232 |
| 5,435,127 | 7/1995 | Luffy et al. | 60/266 |
| 5,586,431 | 12/1996 | Thonebe et al. | 60/266 |
| 5,706,650 | 1/1998 | Thayer | 60/230 |

*Primary Examiner*—Ted Kim
*Attorney, Agent, or Firm*—Norman Friedland

[57] ABSTRACT

The wall downstream of the slot of an ejector forms a divergent angle relative to the upstream wall adjacent to the slot so that the flow discharging from the slot expands and avoids having the primary air from pinching the secondary air and adversely affecting the cooling film issuing from the slot. When multiple slots in the ejector are utilized the downstream wall in relation to the upstream wall is similarly configured to obtain local multi-expansions.

7 Claims, 2 Drawing Sheets

MULTI-EXPANSION EJECTOR NOZZLE WITH DIVERGING WALLS

DESCRIPTION

This invention was made under a U.S. Government contract and the Government has rights herein

CROSS REFERENCE

The subject matter of this patent application relates to the contemporaneously filed patent application of George P. Liang, William J. Yeager and John F. Soileau entitled "Ejector Extension Cooling for Exhaust Nozzle" (Attorney Docket No. F-6798) commonly assigned to United Technologies Corporation. Liang and Soileau are coinventors of the present patent application.

1. Technical Field

This invention relates to cooling systems for exhaust nozzles for gas turbine engines and more particularly to ejector cooling of exhaust nozzles.

2. Background Art

As is well known in the gas turbine engine technology, it is abundantly important to cool the component parts of the engine so that the materials are not overtempertured and adversely affected. Equally known is that in cooling systems that utilize engine air after some work has been performed thereon for cooling purposes which air would otherwise be used for developing engine thrust is an engine performance deficit and when ambient air, such as nacelle bay air or ram air is utilized, additional hardware is necessary to transfer the air from its source to its destination and this adds weight and cost to the engine/aircraft. Hence, engineers and scientists involved in designing aircraft and engines are constantly working on means for improving the effectiveness of these cooling systems so as to minimize this deficit and/or weight and costs.

There are many cooling concepts disclosed in the prior art that deal with cooling gas turbine engine exhaust nozzles and two dimensional exhaust nozzles of the type that in most recent years have been designed for military types of aircraft. Amongst these prior art includes U.S. Pat. No. 4,544,098 granted to Warburton on Oct. 1, 1985 entitled "Cooled Exhaust Nozzle Flaps"; U.S. Pat. No. 5,101,624 granted to Nash et al on Apr. 7, 1992 entitled "Exhaust Nozzle Hinge"; U.S. Pat. No. 5,255,849 granted to Mayer et al entitled "Cooling Air Transfer Apparatus for Aircraft Gas Turbine Engine Exhaust Nozzle"; U.S. Pat. No. 5,335,489 granted to Thayer on Aug. 9, 1994 entitled "Gas Turbine Vectoring Exhaust Nozzle"; and U.S. Pat. No. 5,407,133 granted to Liang on Apr. 18, 1995 entitled Cooled Thin Metal Liner".

Of these patents, U.S. Pat. Nos. 5,255,849 and 5,335,489 disclose cooling systems that utilize ejectors to enhance the cooling effectiveness of the cooling system. The present invention is related to these types of system as it provides means for enhancing the effectiveness of the ejector by increasing its pumping effectiveness by judiciously off-setting the surfaces downstream of the ejector slots. This invention contemplates improving the ejector's performance in ejectors that are mounted in the flaps of the nozzle or in the walls of the exhaust nozzle by providing at least two axially spaced slots and off-setting the geometry configuration to obtain a series of multi-expansion effects from one slot to the next slot.

SUMMARY OF THE INVENTION

An object of this invention is to provide an improved ejector.

Another object of this invention is to provide an improved ejector for the exhaust nozzle of a gas turbine engine by providing at least two axially spaced discharge slots and judiciously configuring the wall adjacent to each of the slots to be angularly disposed relative to the adjacent upstream wall and the angle defines a divergent angle. The slots can be utilized in the flaps and/or side walls of a vectoring nozzle.

A feature of this invention is the divergent angled downstream wall adjacent to each of at least two axially disposed ejector discharge slots in a convergent/divergent exhaust nozzle that includes variable flaps movable to vary the throat and the wall immediately downstream of the throat being configured in the normal designed configuration for providing a seal surface for the divergent flap and which is typically parallel to the flow field.

The foregoing and other features of the present invention will become more apparent from the following description and accompanying drawings.

DETAILED DESCRIPTION OF THE PREFERRED EMBODIMENT

Figure 1:
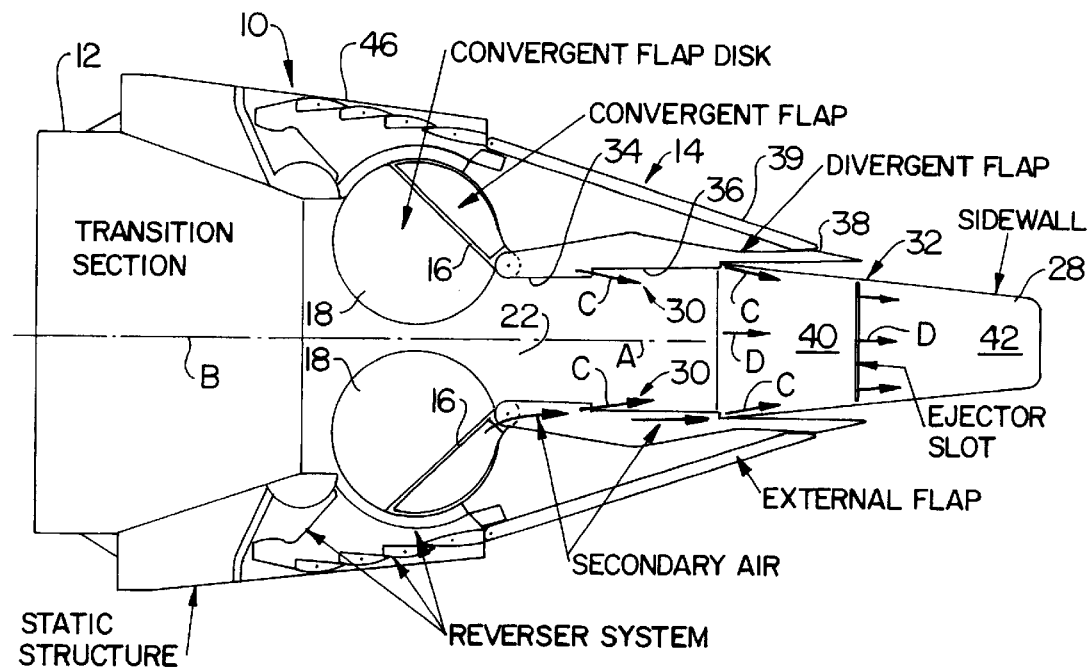
FIG. 1 is a schematic illustration of a prior art vectoring two-dimensional exhaust nozzle of a gas turbine engine with articulating convergent and divergent flaps.

While this invention is being disclosed in the preferred embodiment for enhancing the secondary air entrainment so as to improve the performance for ejector nozzles for two-dimensional vectoring exhaust nozzles of a gas turbine engine powering aircraft, it will be appreciated by those skilled in this art that the invention has utility for ejectors utilized in other environments and other exhaust nozzles. As noted the description of this invention is illustrated with schematic views of a two-dimensional exhaust nozzle, a more detailed description of this embodiment is described in U.S. Pat. No. 4,690,329 granted to William M. Madden on Sep. 1, 1987 entitled "Exhaust Nozzle Coupled With Reverser Exhaust Door" and commonly assigned to the same assignee of the present application and this patent is incorporated herein by reference. Suffice it to say that the two dimensional exhaust nozzle is attached to the end of the augmentor of a gas turbine engine by an exhaust transition duct that fairs a circular cross section into a rectangular cross section. Variable flaps including convergent flaps and divergent flaps are fitted between the side walls of the rectangular shaped configuration and are articulated to define a throat area and to vary the its position in order to change the direction of the engine's exhaust gases prior to being discharged into the ambient.

This invention can best be understood by referring to the prior art schematic illustrations of the exhaust nozzle generally indicated by reference numeral 10 which is substantially the same as the nozzle disclosed in Pat. No. 4,690,329, supra, and is comprised of the transition duct 12 that flows the engine's exhaust gases to the two dimensional nozzle generally indicated by reference numeral 14. The two dimensional nozzle comprises the convergent flaps 16 operatively connected to the circular flap disk 18 for articulation thereof and the divergent flaps 20 operatively connected to the convergent flap 16. Rotational movement of the flap disk 18 serves to articulate the flaps to vary the throat area 22 and change the direction of the exhaust gas stream. For example, rotational movement of each of the flap disks in the opposite direction will open and close the throat area 22 and rotational movement of each of the flap disks 18 in the same direction will change the angle of the two dimensional nozzle center line A with respect to center line B (which during normal flight is in coincidence with the engine's center line B) to change the direction of the flow of the engine gases discharging from the exhaust nozzle to ambient.

The ejector nozzles for the divergent flap is generally indicated by reference numeral 30 and the ejector nozzles for the side walls 28 (only one being shown) of the two dimensional nozzle is generally indicated by reference numeral 32 and the nozzle exhaust slots are adjacent the arrows C and D indicating the discharge of the secondary flow. For the sake of convenience and simplicity this description will describe the ejector nozzle for one of the divergent flaps and one of the side walls with the understanding that there is an identical ejector nozzle on the opposite divergent flap and opposite side wall and like reference numerals depict like parts in all the Figs. As is apparent from viewing FIGS. 1 and 2, the walls 34, 36 and 38 are parallel to each other and parallel to the exhaust gas stream. While not shown in FIG. 1, the walls 40 and 42 are likewise parallelly disposed relative to each other. It will be appreciated as will be apparent from the description to follow that walls 34 are designed such that when the divergent flaps 20 form a relatively good sealing surface so that when closed they form a relatively good seal to block the engine gases from discharging through the exhaust nozzle. This obviously occurs during the reversing cycle when the main gases are diverted to flow through the reversing blocker doors 46.

Figure 2:
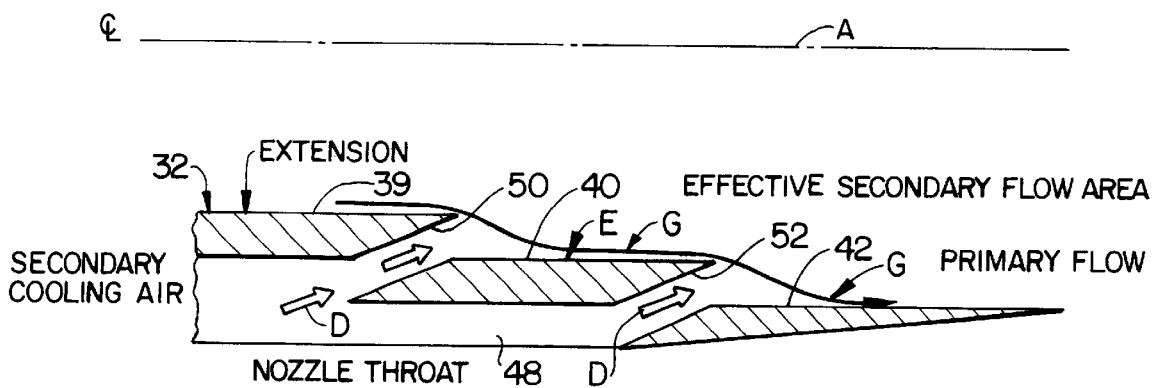
FIG. 2 is a schematic partial view in section of a prior art double slot configuration illustrating the flow expansion process of an ejector.

The ejector flow expansion process of the prior art configuration with these parallel walls are described in FIG. 2. As noted the ejector nozzles 30 and 32 are illustrated by a single view inasmuch as the wall configurations are identical in the divergent flaps and side walls. For this illustration purpose the ejector nozzles 32 of the side wall 28 will be used to describe the expansion process. The ejector nozzle comprises a passage 48 for flowing the secondary air (arrow D) which in this instance is ram air but may be fan or compressor air, which discharges through the axially spaced slots 50 and 52. The configuration of the walls 39, 40 and 42 are planar and parallelly disposed relative to each other. The primary flow which is the engine exhaust gases is depicted by arrow E. As will be appreciated from viewing FIG. 2 the boundary layer of the primary flow E tends to hug the surface of the walls 39, 40 and 42. This flow field is more acerbated when these surfaces are exposed to a flow field which has less flow divergence or turning effect. For example, the surface of the side walls would have less flow divergence or turning effect than the surface of the divergent flap. The adherence of the boundary layer adhering to the surface is further heightened when the cooling slots such as 50 and 52, are small. The consequence of the hugging of the boundary layer to these surfaces is that the effective cooling flow area of the secondary air discharging from slots 50 and 52 is reduced by virtue of the primary mainstream flow during the flow expansion process. As noted the primary flow at points G chokes or pinches-off the secondary cooling air flow area. As a result the cooling air entrainment and the downstream slot film effectiveness of the secondary cooling air is adversely affected and can cause over temperature problems. In other words the ejector will not be able to provide sufficient pumping of the secondary air. This problem is particularly critical when the pressure ratio of the nozzle is low, the area ratio of the nozzle is low at maximum engine augmentation operating conditions.

Figure 3:
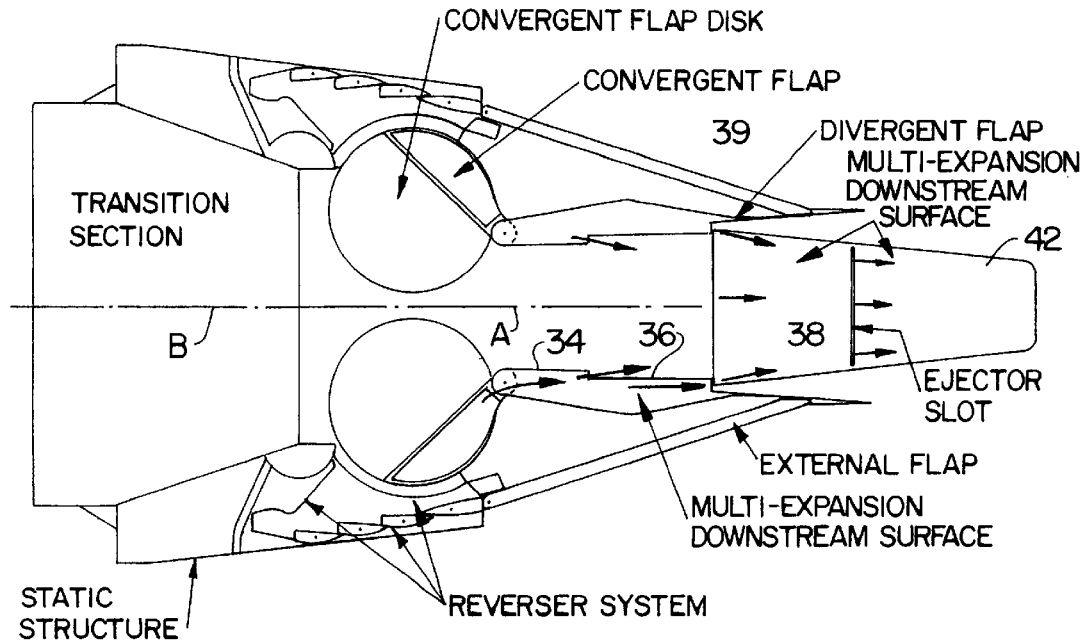
FIG. 3 is a schematic illustration of the same embodiment depicted in FIG. 1 modified with the off-setting geometry of this invention.
Figure 4:
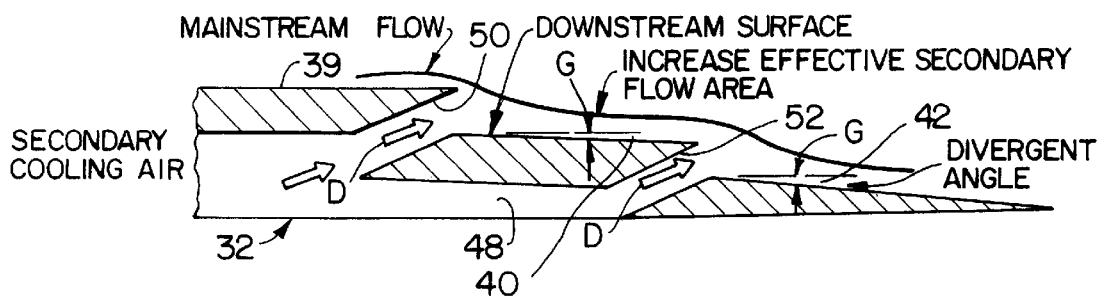
FIG. 4 is a schematic partial view in section similar to the view in FIG. 2 illustrating the details of this invention.

FIGS. 3 and 4 illustrate the invention and describe how the problem described in the immediate above paragraphs is obviated. In accordance with this invention the walls 34 and 39 remain unchanged and in the case of the divergent flap the sealing effectiveness remains the same. The configuration of walls 36, 38 40 and 42 are changed to define a divergent wall downstream of each of the nozzle's slots. It has been found that a significant improvement in the pumping effectiveness of the ejectors 30 and 32 is realized by diverging the downstream surfaces of each of the slots (walls 36, 38, 40 and 42) from the upstream surface (walls 39 and 34) at substantially three (3) to eight (8) degrees angle. The expansion process of these surfaces are shown in FIG. 4 where the boundary layer of the primary mainstream flow is further from the wall and hence, does not pinch-off or choke the secondary air flow area.

What has been shown by this invention is a relatively simple way of enhancing the pumping capabilities of an ejector and hence, enhancing the film cooling effectiveness of the secondary air stream. The relative off-setting geometry orientation of the walls downstream of the ejector nozzle slots, which does not significantly add to the weight, complexity and cost, increases the turning angle of the primary flow, accelerates the mainstream flow and increases the secondary air effective flow area. The cumulative effect of this off-setting geometry results in a series of multi-expansion effects from one slot to the next slot. This process effectively creates multi-local expansion for the ejector nozzle.

While the phenomenon is shown using the side wall as being illustrative, the phenomenon is equally applicable to the divergent flaps and obviously, applicable to other application and is not necessarily limited to two-dimensional exhaust nozzle configurations.

Although this invention has been shown and described with respect to detailed embodiments thereof, it will be appreciated and understood by those skilled in the art that various changes in form and detail thereof may be made without departing from the spirit and scope of the claimed invention.

What is claimed is:

1. An ejector for fluidly pumping another fluid having a main body having a longitudinal axis and defining a passageway for flowing primary gas defining a primary gaseous stream, said main body including a first fixed discharge slot for flowing a secondary gases defining a secondary stream, said main body having a first wall disposed upstream of said first fixed discharge slot and a second wall disposed downstream of said first fixed discharge slot and radially spaced outward from said first wall defining a boundary for the primary gaseous stream of said ejector, the improvement wherein said second wall defines a divergent angle relative to said first wall, wherein the primary gaseous stream expands adjacent said first fixed discharge slot for pumping the secondary flow so as not to pinch the secondary gaseous stream egressing from said discharge slot, second fixed discharge slot in fluid communication with said passageway and being disposed downstream of said first fixed discharge slot and adjacent to said second wall, a third wall also defining a boundary for said primary gaseous stream and being radially spaced outward from said second wall and said third wall defining a divergent angle relative to said first wall, wherein the primary gaseous stream expands adacent to said second fixed discharge slot so that the primary gaseous stream does not pinch the flow of secondary gaseous stream egressing from said second fixed discharge slot and being pumped thereby, each of said second and third walls also divering with respect to the longitudinal axis, and wherein said secondary gaseous stream is cooling air and said primay gaseous steam is the exhaust gases from a gas turbine engine.

2. An ejector for fluidly pumping another fluid as claimed in claim 1 wherein the divergent angle of said second wall is substantially within the range of 3 to 8 degrees.

3. An ejector for fluidly pumping another fluid as claimed in claim 1 wherein the divergent angle of said third wall is substantially within the range of 3 to 8 degrees.

4. For the exhaust nozzle of a gas turbine engine having a two dimensional vectoring nozzle with parallel side walls, flap means disposed within said side walls and defining with said side walls a passage for the exhaust gases of said engine, a multi-expansion ejector for fluidly pumping another fluid having a main body having a longitudinal axis and including a portion of said side walls for defining a passageway including a first and second of axially disposed fixed discharge slots for flowing cooling air and defining a secondary stream for the ejector, said side walls including a first wall portion disposed upstream of said first fixed discharge fixed discharge slots, a second wall portion disposed downstream of said first fixed discharge slots and being radially spaced outwardly from said first wall portion, and a third wall portion disposed downstream of said second wall portion and said second discharge slot, said first wall portion, said second wall portion and said third wall portion defining a boundary for said exhaust gases and a primary stream for said ejector, said second wall portion defining a divergent angle relative to said first wall portion for localized expansion of said primary stream and said third wall portion defining a divergent angle relative to said first wall portion for localized expansion of said primary stream whereby the flow of cooling air discharging from said first fixed discharge slot and said second fixed discharge slot is not pinched so that the first fixed discharge slot and second fixed discharge slot coalesces the secondary cooling air to form a film of cooling air adjacent to said second wall portion and said third wall portion, each of said second and third wall portions diverging with respect to said longitudinal axis.

5. For the exhaust nozzle of a gas turbine engine as claimed in claim 4 wherein the divergent angle of said second wall portion and said third wall portion is substantially within the range of 3 to 8 degrees.

6. For the exhaust nozzle of a gas turbine engine having a two dimensional vectoring nozzle with parallel side walls, flap means including a divergent flap having wall means disposed within said side walls and defining with said side walls a passage for the exhaust gases of said engine, a multi-expansion ejector for fluidly pumping another fluid having a main body having a longitudinal axis and including a portion of said wall means for defining a passageway including a pair of axially disposed fixed discharge slots defining a first and second fixed discharge slot for flowing cooling air and defining a secondary stream for the ejector, said wall means including a first wall portion disposed upstream of one of said pair of slots, a second wall portion disposed downstream of said one of said pair of slots and being radially spaced outwardly from said first wall portion, and a third wall portion disposed downstream of said second wall portion and said second discharge slot, said first wall portion, said second wall portion and said third wall portion defining a boundary for said exhaust gases and a primary stream for said ejector, said second wall portion defining a divergent angle relative to said first wall portion for localized expansion of said primary stream and said third wall portion defining a divergent angle relative to said first wall portion for defining another localized expansion of said primary stream whereby the flow of cooling air discharging from said first slot and said second slot is not pinched so that the first slot and second slot coalesces the secondary cooling air to form a film of cooling air adjacent to said wall means, said second and third wall portions diverging with respect to said longitudinal axis.

7. For the exhaust nozzle of a gas turbine engine as claimed in claim 6 wherein the divergent angle of said second wall portion and said third wall portion is substantially within the range of 3 to 8 degrees.

* * * * *